(12) United States Patent
Stewart et al.

(10) Patent No.: US 8,806,977 B2
(45) Date of Patent: Aug. 19, 2014

(54) VEHICLE PEDAL ASSEMBLY WITH HYSTERESIS ASSEMBLY

(71) Applicants: William S. Stewart, Elkhart, IN (US); Robert F. Oldenburg, Constantine, MI (US); Murray Kaijala, Elkhart, IN (US)

(72) Inventors: William S. Stewart, Elkhart, IN (US); Robert F. Oldenburg, Constantine, MI (US); Murray Kaijala, Elkhart, IN (US)

(73) Assignee: CTS Corporation, Elkhart, IN (US)

( * ) Notice: Subject to any disclaimer, the term of this patent is extended or adjusted under 35 U.S.C. 154(b) by 0 days.

(21) Appl. No.: 13/644,461

(22) Filed: Oct. 4, 2012

(65) Prior Publication Data

US 2013/0087009 A1    Apr. 11, 2013

Related U.S. Application Data

(60) Provisional application No. 61/544,871, filed on Oct. 7, 2011, provisional application No. 61/604,361, filed on Feb. 28, 2012.

(51) Int. Cl.
*G05G 1/30* (2008.04)

(52) U.S. Cl.
USPC ............................................................ 74/512

(58) Field of Classification Search
USPC .......................................... 74/512, 513, 560
See application file for complete search history.

(56) References Cited

U.S. PATENT DOCUMENTS

| | | | |
|---|---|---|---|
| 4,944,269 A | 7/1990 | Imoehl | |
| 5,408,899 A | 4/1995 | Stewart | |
| 5,524,589 A | 6/1996 | Kikkawa et al. | |
| 5,697,260 A | 12/1997 | Rixon et al. | |
| 5,868,040 A | 2/1999 | Papenhagen et al. | |
| 5,937,707 A | 8/1999 | Rixon et al. | |
| 6,003,404 A * | 12/1999 | Hannewald | ..................... 74/512 |
| 6,070,490 A | 6/2000 | Aschoff et al. | |
| 6,073,610 A | 6/2000 | Matsumoto et al. | |
| 6,098,971 A | 8/2000 | Stege et al. | |
| 6,158,299 A | 12/2000 | Czajkowski | |
| 6,167,778 B1 | 1/2001 | Kohlen | |
| 6,211,668 B1 | 4/2001 | Duesler et al. | |

(Continued)

FOREIGN PATENT DOCUMENTS

| | | |
|---|---|---|
| DE | 44 07 005 | 3/1995 |
| DE | 44 26 549 | 2/1996 |

(Continued)

OTHER PUBLICATIONS

Mike Wum, CTS 705 Series Pedal, Jul. 20, 2010, CTS Corporation, Elkhart, Indiana, U.S.

*Primary Examiner* — Vicky Johnson
(74) *Attorney, Agent, or Firm* — Daniel J. Deneufbourg

(57) ABSTRACT

A vehicle pedal assembly with a rotatable pedal. A hysteresis assembly includes a friction device and plunger, and first and second springs that are all separate and decoupled from each other and the pedal. The first spring exerts a force against the friction plunger that forces the friction device into frictional contact with the housing to generate and transfer a resistance force to the pedal. The first spring also exerts a force against the pedal when a foot force is removed from the pedal to return the pedal to idle with and without the movement of the friction device and without the force of the second spring. The second spring exerts a force against the friction device when the foot force is removed to return the pedal to idle without the force of the first spring. Barriers block the entry of debris into the housing.

12 Claims, 7 Drawing Sheets

(56) References Cited

U.S. PATENT DOCUMENTS

| | | |
|---|---|---|
| 6,289,762 B1 | 9/2001 | Silva |
| 6,330,838 B1 | 12/2001 | Kalsi |
| 6,336,377 B1 | 1/2002 | Reimann et al. |
| 6,360,631 B1 | 3/2002 | Wortmann et al. |
| 6,418,813 B1 | 7/2002 | Lewis |
| 6,426,619 B1 | 7/2002 | Pfaffenberger et al. |
| 6,446,526 B2 | 9/2002 | Reimann et al. |
| 6,474,191 B1 | 11/2002 | Campbell |
| 6,523,433 B1 | 2/2003 | Staker |
| 6,553,863 B1 | 4/2003 | Djordjevic |
| 6,658,963 B2 * | 12/2003 | Yaddehige ............... 74/512 |
| 6,745,642 B2 | 6/2004 | Kumamoto et al. |
| 6,758,114 B2 | 7/2004 | Sundaresan et al. |
| 6,860,170 B2 | 3/2005 | DeForest |
| 7,051,615 B2 * | 5/2006 | Kumamoto et al. ......... 74/513 |
| 7,404,342 B2 | 7/2008 | Wurn |
| 7,926,384 B2 | 4/2011 | Wurn |
| 8,042,430 B2 | 10/2011 | Campbell |
| 2002/0056337 A1 | 5/2002 | Sundaresan et al. |
| 2002/0100341 A1 | 8/2002 | Kumamoto et al. |
| 2002/0152831 A1 | 10/2002 | Sakamoto et al. |
| 2004/0065167 A1 | 4/2004 | Kim |
| 2005/0034555 A1 | 2/2005 | Staker |
| 2005/0145058 A1 | 7/2005 | Kohlen et al. |
| 2005/0247158 A1 * | 11/2005 | Willemsen et al. ......... 74/513 |
| 2006/0117902 A1 | 6/2006 | Martin et al. |
| 2006/0179972 A1 | 8/2006 | Peniston et al. |
| 2006/0230875 A1 | 10/2006 | Ouyang |
| 2007/0193401 A1 | 8/2007 | Campbell |
| 2007/0234842 A1 | 10/2007 | Elliott |
| 2008/0276749 A1 * | 11/2008 | Stewart et al. ............ 74/512 |
| 2009/0173587 A1 | 7/2009 | Campbell |
| 2010/0077886 A1 | 4/2010 | Seiltz et al. |
| 2011/0100153 A1 | 5/2011 | Stewart et al. |

FOREIGN PATENT DOCUMENTS

| | | |
|---|---|---|
| DE | 195 04 971 | 8/1996 |
| DE | 195 21 821 | 12/1996 |
| DE | 195 36 699 | 4/1997 |
| DE | 197 01 637 | 7/1998 |
| DE | 198 11 442 | 9/1999 |
| DE | 100 21 532 | 11/2001 |
| DE | 101 35 537 | 1/2003 |
| DE | 102 50 966 | 5/2004 |
| DE | 103 35 598 | 2/2005 |
| DE | 102006021472 | 11/2007 |
| EP | 0 670 235 | 2/1995 |
| EP | 0 748 713 | 12/1996 |
| EP | 0 974 886 | 1/2000 |
| EP | 1 033 275 | 9/2000 |
| EP | 1 154 346 | 11/2001 |
| EP | 0 899 147 | 10/2003 |
| EP | 2 053 483 | 4/2009 |
| EP | 2 075 665 | 7/2009 |
| EP | 2256581 | 12/2010 |
| FR | 2 138 249 | 1/1973 |
| GB | 2349447 | 11/2000 |
| JP | 10 083224 | 3/1998 |
| JP | 2000326754 | 11/2000 |
| WO | WO 97/30863 | 8/1997 |
| WO | WO 01/81110 | 11/2001 |
| WO | WO 2004/045886 | 6/2004 |
| WO | WO 2004/107079 | 12/2004 |
| WO | WO 2006/100133 | 9/2006 |

* cited by examiner

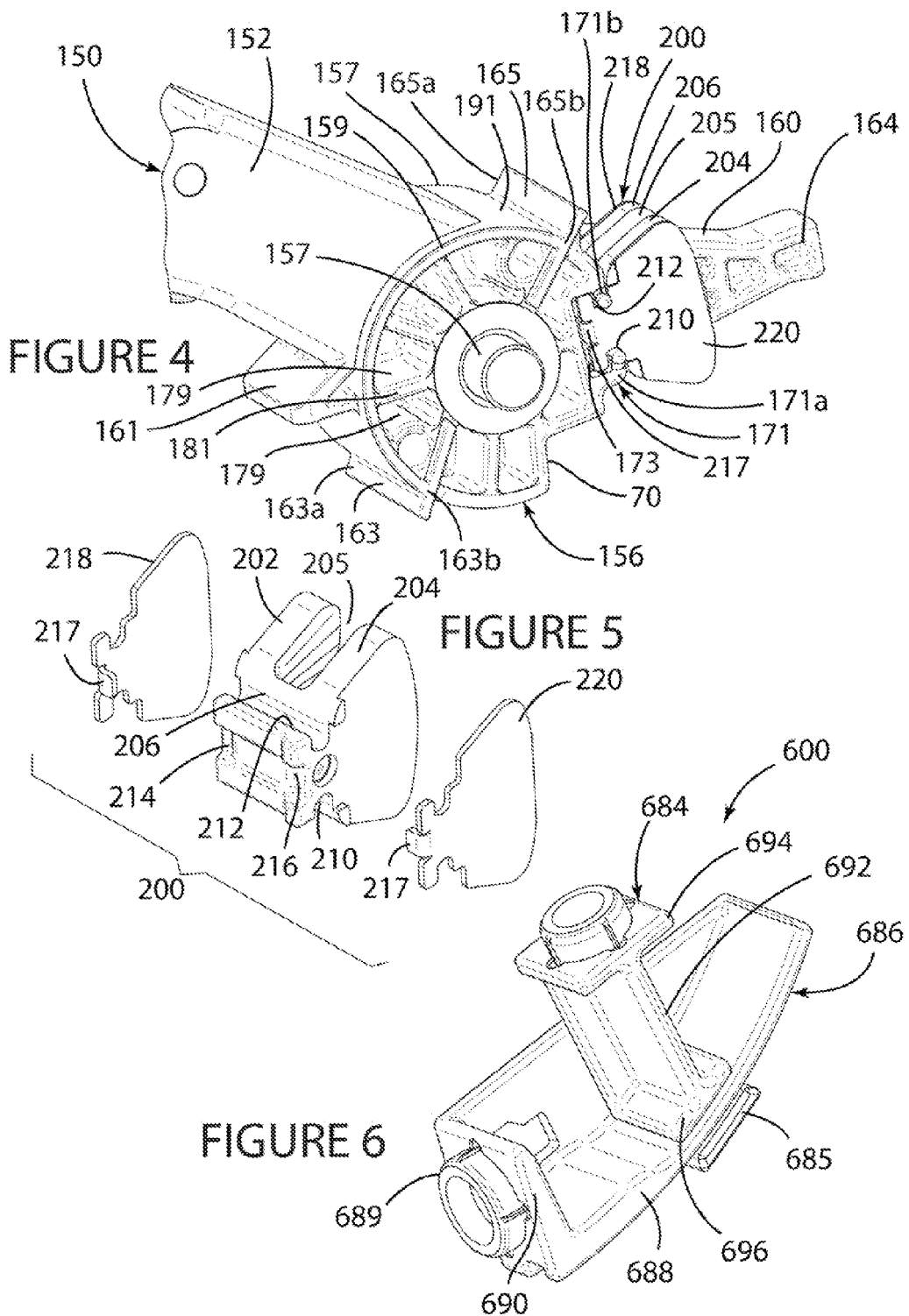

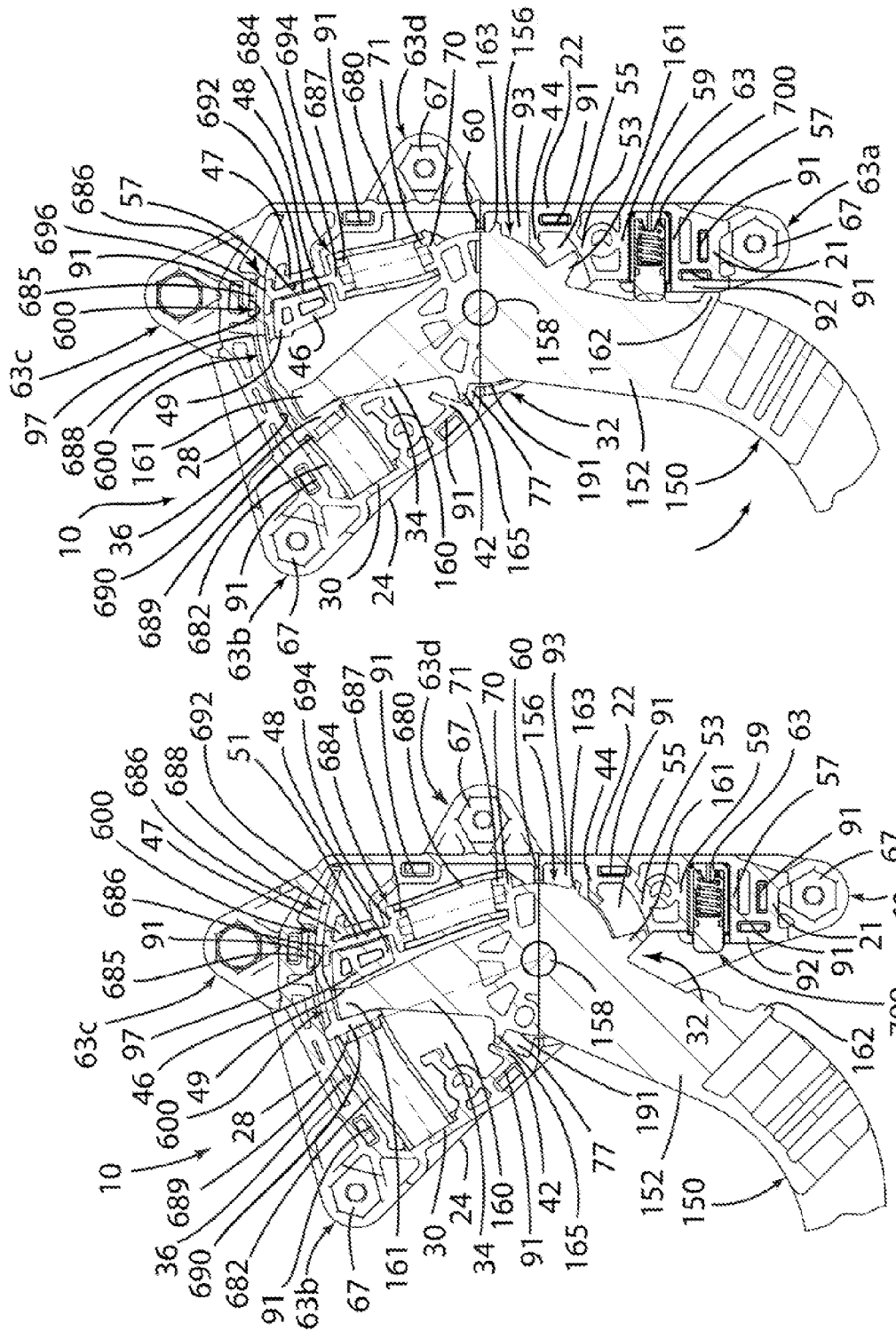

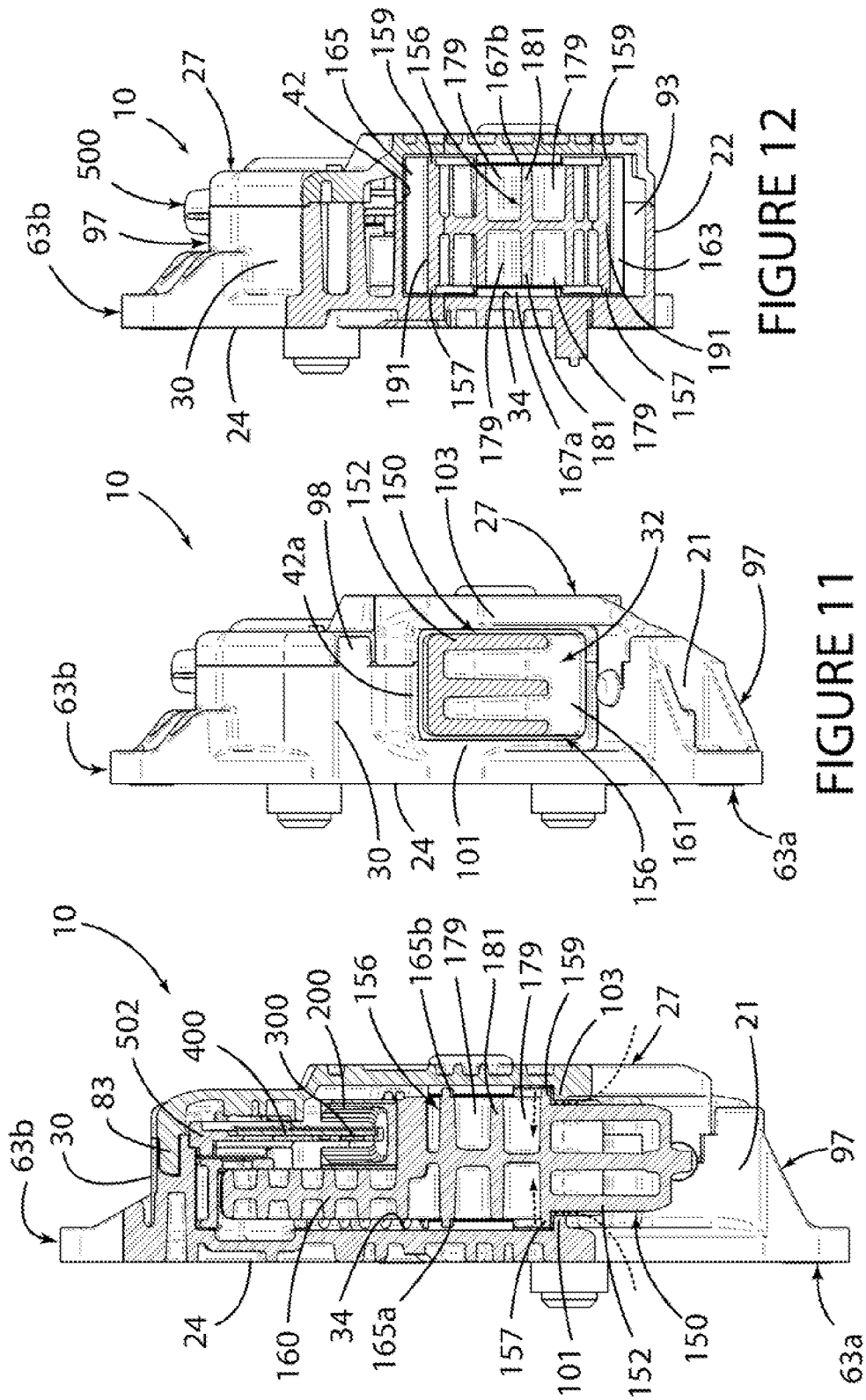

VEHICLE PEDAL ASSEMBLY WITH HYSTERESIS ASSEMBLY

CROSS-REFERENCE TO RELATED APPLICATION

This application claims the benefit of the filing date and disclosure of U.S. Provisional Application Ser. No. 61/544,871 filed on Oct. 7, 2011 and U.S. Provisional Application Ser. No. 61/604,361 filed on Feb. 28, 2012, which are explicitly incorporated herein by reference as are all references cited therein.

FIELD OF THE INVENTION

The present invention relates generally to a pedal mechanism, and in particular, to a vehicle accelerator pedal assembly with a hysteresis assembly.

BACKGROUND OF THE INVENTION

Automobile accelerator pedals have, in the past, been linked to engine fuel subsystems by a cable, generally referred to as a Bowden cable. While such accelerator pedal designs varied, the typical return spring and cable friction together created a common and accepted tactile response for automobile drivers. For example, friction between the Bowden cable and its protective sheath reduced the foot pressure required from the driver to hold a given throttle position. Likewise, friction prevented road bumps felt by the driver from immediately affecting throttle position.

The mechanical cable-driven throttle systems, however, have been replaced with a more fully electronic, sensor-driven approach. With the fully electronic approach, the position of the accelerator pedal is read with a position sensor and a corresponding position signal is made available for throttle control. The sensor-based approach has been especially compatible with electronic control systems in which accelerator pedal position is one of the several variables used for engine control.

Although such drive-by-wire configurations have been technically practical, drivers have generally preferred the feel, i.e., the tactile response, of the conventional cable-driven throttle systems. Designers have attempted to address this preference with hysteresis/friction-generating mechanisms or modules in the electronic pedal assemblies which emulate the tactile response of cable-driven accelerator pedals.

In this regard, there continues to be a need for a simpler, more cost-effective, and more reliable vehicle pedal assembly with a hysteresis/friction-generating assembly.

SUMMARY OF THE INVENTION

The present invention is generally directed to a vehicle pedal assembly which comprises a pedal housing; a pedal extending into the pedal housing, the pedal being mounted to the pedal housing for rotation relative to the pedal housing; and a pedal hysteresis assembly in the pedal housing including a friction device adapted for movement in the pedal housing, a friction plunger adapted to exert a force against the friction device, a first spring extending between the pedal and the friction plunger and adapted to exert a spring force against the friction plunger which causes the friction plunger to exert the force against the friction device which causes the friction device into abutting frictional contact with the pedal housing in response to the rotation of the pedal to generate and transfer a resistance force to the pedal; a lever arm extending from the pedal into contact with the friction device and adapted to move the friction device in a first direction in response to the rotation of the pedal; and a second spring in contact with the friction device and adapted to exert a spring force against and move the friction device in a second direction opposite the first direction.

In one embodiment, the pedal housing defines a channel and the friction plunger is adapted to move in the channel.

In one embodiment, the friction plunger includes an elongate base extending in the channel and opposed plunger plates adapted to abut against the first spring and the friction device respectively.

In one embodiment, the friction device includes a base abutted against an interior surface of the pedal housing and a wall, the second spring and the lever arm abutting against the wall of the friction device.

In one embodiment, the wall of the friction device extends between the second spring and the lever arm.

In one embodiment, the first end of the pedal includes a drum defining a shoulder, the first spring extending between the shoulder on the drum and the friction plunger.

In one embodiment, the pedal housing defines a front opening and includes a back wall, the pedal extending through the front opening, and the friction device being adapted for frictional contact with the back wall of the housing.

The present invention is also directed to a vehicle pedal assembly that comprises a pedal housing, a pedal extending into the pedal housing and adapted for rotation relative to the pedal housing from an idle position in response to the application of a foot force against the pedal, a pedal hysteresis assembly in the pedal housing including a friction device that is separate from the pedal and adapted for movement in the pedal housing in response to the rotation of the pedal from the idle position, and means for rotating and returning the pedal to its idle position with and without the movement of the friction device.

In one embodiment, the means for rotating and returning the pedal to its idle position with and without the movement of the friction device comprises a first spring between and separate from the pedal and the friction device, the first spring generating a first compressive force that causes the friction device into abutting frictional contact with the pedal housing in response to the rotation of the pedal for generating and transferring a resistance force to the pedal, the first spring also being adapted to exert a second compressive force against the pedal in response to the removal of the foot force from the pedal that returns the pedal to its idle position with and without the movement of the friction device.

In one embodiment, the pedal hysteresis assembly includes a friction plunger that is separate from and extends between the first spring and the friction device, the first spring being adapted to exert the first spring compression force against the friction plunger which causes the friction device into abutting frictional contact with the pedal housing.

In one embodiment, the pedal hysteresis assembly further includes means for rotating and returning the pedal to its idle position without the second compressive force of the first spring.

In one embodiment, the means for rotating and returning the pedal to its idle position without the second compressive force of the first spring comprises a lever arm extending from the pedal into contact with the friction device and a second spring extending between the pedal housing and the friction device, the second spring being adapted to exert a compressive spring force against the friction device in response to the removal of the foot force from the pedal which causes the movement of the friction device, the rotation of the pedal lever arm, and the return of the pedal to its idle position without the second compressive force of the first spring.

In one embodiment, the first spring is adapted to rotate and return the pedal to its idle position without the compressive spring force of the second spring.

The present invention is further directed to a vehicle pedal assembly comprising a pedal housing; a pedal extending into the pedal housing, the pedal being mounted to the pedal housing for rotation relative to the pedal housing from an idle position in response to the application of a foot force against the pedal; and a pedal hysteresis assembly in the pedal housing that includes a friction device that is separate from the pedal and adapted for movement in the pedal housing, a friction plunger that is separate from the friction device and the pedal and adapted to exert a force against the friction device, a first spring that is separate from the pedal and the friction device and the friction plunger and extends between the pedal and the friction plunger and is adapted to exert a first spring force against the friction plunger which causes the friction plunger to exert the force against the friction device which causes the friction device into abutting frictional contact with the pedal housing in response to the rotation of the pedal to generate and transfer a resistance force to the pedal, the first spring also being adapted to exert a second spring force against the pedal in response to the removal of the foot force from the pedal that returns the pedal to its idle position with and without the movement of the friction device, a lever arm extending from the pedal into contact with the friction device and adapted to move the friction device in a first direction in response to the rotation of the pedal, and a second spring in contact with the friction device and adapted to exert a spring force against and move the friction device and the lever arm in response to the removal of the foot force from the pedal that returns the pedal to its idle position without the second spring force of the first spring, the first spring further being adapted to exert the second spring force against the pedal in response to the removal of the foot force from the pedal to return the pedal to its idle position without the spring force of the second spring.

The present invention is still further directed to a vehicle pedal assembly comprising a pedal housing defining a front opening and an interior cavity, a pedal including a pedal arm extending through the front opening and a drum located in the interior cavity, and a first debris barrier defined at the front opening of the pedal housing.

In one embodiment, the first debris barrier includes respective opposed and adjacent extended shoulders formed on the pedal housing and the pedal drum.

In one embodiment, another first debris barrier is defined by an outwardly projecting tab on a lower portion of the drum and is located opposite the front opening of the pedal housing.

In one embodiment, a second debris barrier is defined by at least a first outwardly projecting ear formed on the drum of the pedal and is located behind the first debris barrier.

In one embodiment, at least a first debris retention chamber is defined in the interior cavity of the pedal housing between the first and second debris barriers.

In one embodiment, the pedal housing includes a back wall and further comprises a pedal hysteresis assembly located in the interior cavity of the pedal housing between the drum and the back wall of the pedal housing, the pedal hysteresis assembly includes a friction device adapted for sliding movement against the back wall of the pedal housing, a friction plunger adapted to exert a force against the friction device, a first spring extending between the drum and the friction plunger and adapted to exert a spring force against the friction plunger, and a second spring is adapted to exert a spring force against the friction device.

There are other advantages and features of this invention which will be more readily apparent from the following detailed description of the embodiment of the invention, the drawings, and the appended claims.

BRIEF DESCRIPTION OF THE DRAWINGS

In the accompanying drawings that form part of the specification, and in which like numerals are employed to designate like parts throughout the same:

FIG. 1a is an enlarged vertical cross-sectional view of the housing/cover clip securing structure of the vehicle pedal assembly of FIG. 1);

FIG. 4 is a partially broken perspective view of the drum of the pedal of the vehicle pedal assembly of FIG. 1;

FIG. 5 is an exploded perspective view of the magnet assembly of the vehicle pedal assembly of FIG. 1;

FIG. 6 is a perspective view of the friction pressure plunger and friction plate of the hysteresis assembly of the vehicle pedal assembly of FIG. 1;

FIG. 7 is a vertical cross-sectional view of the vehicle pedal assembly of FIG. 1 with the pedal in its disengaged idle position;

FIG. 8 is a vertical cross-sectional view of the vehicle pedal assembly of FIG. 1 with the pedal in its engaged acceleration position;

FIG. 10 is a front vertical cross-sectional view of the vehicle pedal assembly of FIG. 1 taken along the line 10-10 in FIG. 9;

FIG. 11 is a front vertical cross-sectional view of the vehicle pedal assembly of FIG. 1 taken along the line 11-11 in FIG. 9; and FIG. 12 is a front vertical cross-sectional view of the vehicle pedal assembly of FIG. 1 taken along the line 12-12 in FIG. 9.

DETAILED DESCRIPTION OF THE EMBODIMENT

Figure 1:
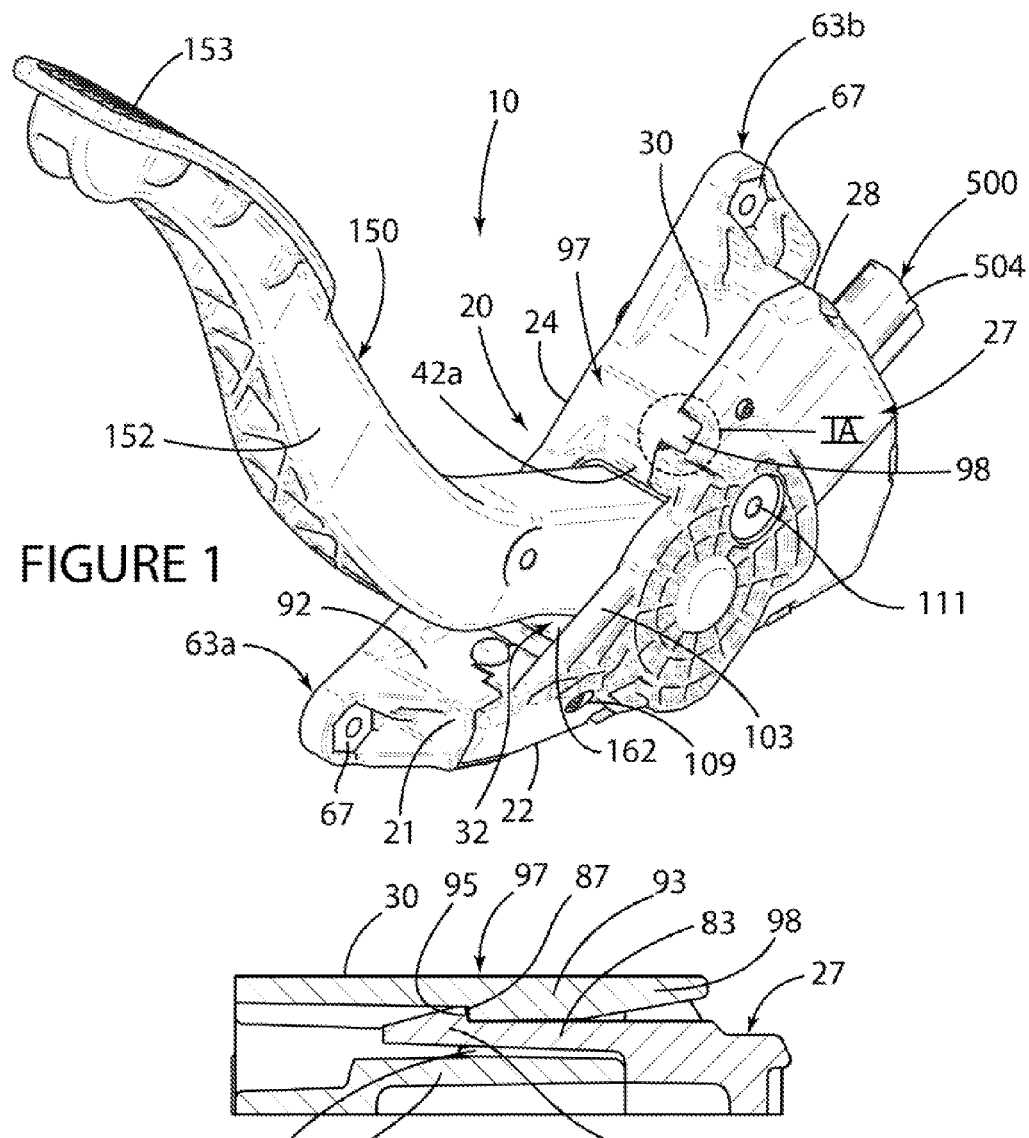
FIG. 1 is a perspective view of a vehicle pedal assembly in accordance with the present invention.

The FIGURES depict a vehicle pedal assembly 10 in accordance with the present invention which comprises, in part, a pedal housing 20 and a pedal 150 extending into the pedal housing 20.

The pedal housing 20, which may be made of any suitable molded plastic material, includes a base wall or floor 22 (FIGS. 1, 2, 3, 7, 8, 9, and 12); a pair of spaced-apart and generally parallel side walls 24 and 27 (FIGS. 1, 2, 3, 7, 8, 9, 10, 11, and 12) extending generally normally outwardly from the floor 22; a partial front wall 21 (FIGS. 1, 2, 3, 7, 8, 9, 10, and 11) extending outwardly from the front peripheral edge of the base wall 22; a back or rear or top generally arcuate wall 28 (FIGS. 1, 2, 3, 7, 8, and 9) extending outwardly from the back or rear or top peripheral edge of the base wall 22 and extending between the respective back or rear or top peripheral edges of the respective side walls 24 and 27; and a front wall 30 (FIGS. 1, 2, 3, 7, 8, 9, 11, and 12) extending between the front peripheral edge of the respective side walls 24 and 27 and the back wall 28 in a relationship spaced and opposed to the base wall 22.

The base wall 22, the side walls 24 and 27, the partial front wall 21, the back or top wall 28, and the front wall 30 together define a front housing opening 32 (FIGS. 1, 3, 7, 8, and 11) and an interior housing cavity 34 (FIGS. 2, 3, 7, 8, 9, 10, and 12). The back or top wall 28 includes an interior surface 36 (FIGS. 2, 3, 7, and 8) that faces into the interior housing cavity 34, extends in a relationship generally normal to the respective side walls 24 and 27, and together with the back or top wall 28 defines a back or top housing opening 29 (FIGS. 2 and 3) through which is inserted a combination printed circuit board (PCB) holder/connector 500 as described in more detail below.

The interior of the housing 20 and, more specifically, the interior surface of respective ones of the housing walls, includes several partial interior walls or ribs protruding generally normally outwardly therefrom into the interior of the housing cavity 34 as described in more detail below.

A first partial, and generally L-shaped, wall or rib 42 (FIGS. 2, 3, 7, 8, and 9) is located in the housing cavity 34 on a first or front side of the drum 156 of the pedal 50 and includes a first end defining an elongate extended housing shoulder and pedal arm stop 42a (FIGS. 1, 2, 3, 9, and 11) and a second free end 42b (FIG. 3) spaced from the first end, the front wall 30, and the drum 156. The elongate extended horizontal shoulder 42a of the wall 42 defines an extended peripheral horizontal edge on the front housing wall 30 that is positioned in a relationship opposed and adjacent the exterior surface 191 of the drum 156 of the pedal 150. In the embodiment shown, the rib 42 is defined by plastic material protruding outwardly from the front housing wall 30 and the housing side walls 24 and 27.

Another partial wall or rib 44 (FIGS. 2, 3, 7, and 8), which comprises plastic material protruding generally normally outwardly from both the interior surface of each of the housing side walls 24 and 27 and the interior surface of the housing base wall 22, is located and defined in the housing cavity 34 below and adjacent the exterior surface 191 of the drum 156 of the pedal 150 and includes a first end unitary with the interior surface of the base wall 22 and a second angled free end that defines a pedal arm stop and is located adjacent and opposed to the exterior surface 191 of the drum 156 of the pedal 150. The partial wall or rib 44 is located on a second or base side of the drum 156 opposite the first or front side of the drum 156 with the partial wall or rib 42 adjacent thereto.

Yet another partial wall or rib 53 (FIGS. 2, 3, 7, 8, and 9), that comprises plastic material protruding outwardly from both the interior surface of each of the housing side walls 24 and 27 and the interior surface of the housing base wall 22, is located and defined in the housing cavity 34 on the second or base side of the drum 156 of the pedal 150 and includes a first end unitary with the interior surface of the housing base wall 22 and a second end spaced and located below the partial wall 44 and together with the partial wall 44 define an interior arcuate receptacle or chamber 55 (FIGS. 2, 3, 7, 8, and 9) that is located in the interior of the housing 20 below and on the housing base wall side of the drum 156 of the pedal 150 and adjacent the lower peripheral horizontal edge of the front housing opening 32.

Yet additional spaced-apart and generally parallel partial walls or ribs 57 and 59 (FIGS. 2, 3, 7, 8, and 9), which comprise plastic material protruding generally normally outwardly from the interior surface of each of the housing side walls 24 and 27 and the interior surface of the housing base wall 22, are located in a relationship spaced and below the partial wall 53 and together define an interior receptacle 63 (FIGS. 2, 3, 7, 8, and 9) for a vehicle pedal kickdown assembly 700 as described in more detail below.

Yet a further partial wall or rib 60 (FIGS. 3, 7, 8, and 9) is comprised of plastic material protruding generally normally outwardly from the interior surface of each of the housing side walls 24 and 27 and the interior surface of the housing base wall 22 and is located in the interior of the housing 20 in a relationship adjacent and opposed to the exterior surface 191 of the drum 156 and above the wall or rib 44. The wall or rib 60 includes a first end unitary with the base wall 22 and a second free end which is located adjacent and opposed to the exterior surface 191 of the drum 156. The partial walls or ribs 44 and 60 are positioned in a spaced-apart and generally parallel relationship and together define an interior receptacle or chamber 93 (FIGS. 3, 7, 8, and 12) in the interior of the housing 20. The wall or rib 60 and the receptacle or chamber 93 are both located on the second or housing base wall side of the drum 156 opposite the first or front side of the drum 156 with the partial wall or rib 42 adjacent thereto.

An additional pair of partial, spaced-apart, and generally parallel walls or ribs 46 and 47 (FIGS. 7 and 8), that are made of plastic material protruding generally normally outwardly from the interior surface of the housing side wall 24, are located in an upper or rear corner of the housing 20 and cavity 34 in a relationship above and spaced from the drum 156 of the pedal 150 and spaced and generally normal to and in front of the interior surface 36 of the back housing wall 28.

Each of the walls 46 and 47 includes a first shouldered end 48 (FIGS. 7 and 8) defining a stop for a friction pressure plunger 684 (FIGS. 3, 6, 7, and 8). The wall 46 additionally defines a second end or shoulder or idle stop 49 (FIGS. 7 and 8) that is opposed and spaced from the end 48 and defines an idle stop for a pedal lever arm 160 and thus an idle stop for the pedal 150. The walls 46 and 47 in combination also define an elongate channel 51 (FIGS. 7 and 8) therebetween.

The housing side walls 24 and 27 additionally include respective arcuate and diametrically opposed walls or ribs 101 and 103 (FIGS. 10 and 11) of plastic material that project outwardly from the interior surface of the respective housing side walls 24 and 27 and define respective extended and diametrically opposed arcuate housing side wall shoulders in the region of the front opening 32 of the pedal housing 20.

A plurality of spaced-apart anchors 63a, 63b, 63c, and 63d (FIGS. 1, 2, 3, 7, 8, 9, 10, 11, and 12) extend and project outwardly from the pedal housing 20 and, more specifically, extend and project outwardly from respective ones of the housing walls.

The anchor 63a (FIGS. 1, 2, 3, 7, 8, 9, 10, and 11) extends and projects outwardly from a lower front corner of the housing 20 defined by a lower corner of the housing side wall 24 and the housing base wall 22.

The anchor 63c (FIGS. 3, 7, 8, and 9) extends and projects outwardly from an upper back corner of the housing 20 wherein the back or top housing wall 28 is joined to an upper back corner of the housing base wall 22.

The anchor 63b (FIGS. 1, 2, 3, 7, 8, 9, 10, 11, and 12) extends and projects outwardly from the upper front corner of the housing 20 where the housing side wall 24, the top or rear housing wall 28, and the housing front wall 28 are joined together.

The anchor 63d (FIGS. 3, 7, 8, and 9) is located between the anchors 63a and 63c and extends and projects outwardly from the exterior surface of the housing base wall 22.

Figure 2:
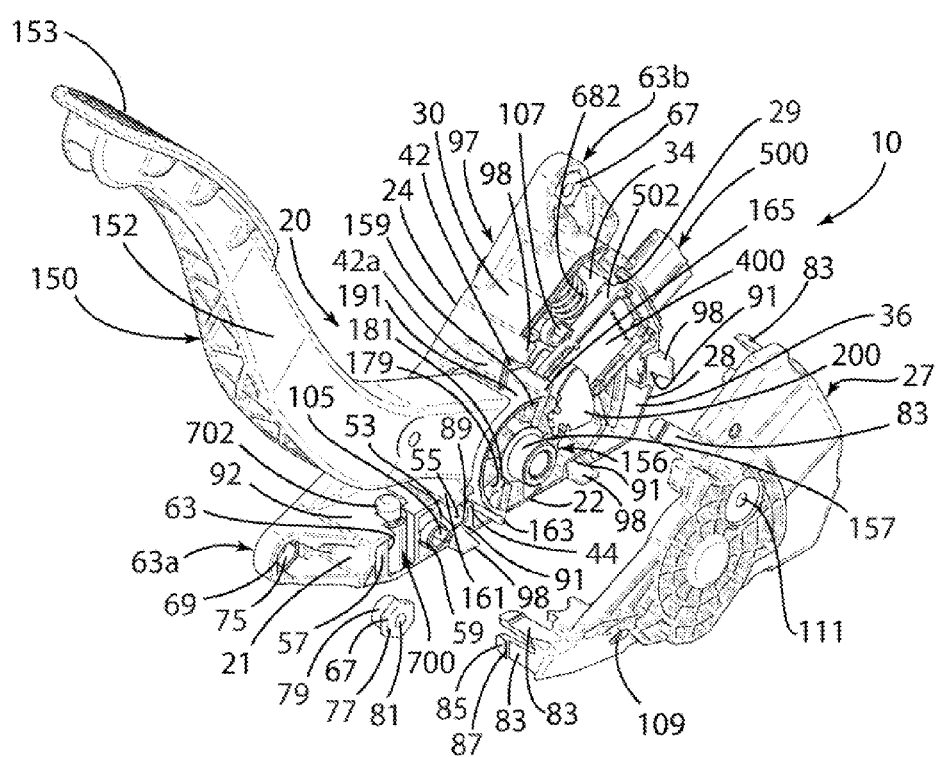
FIG. 2 is a perspective view of the vehicle pedal assembly of FIG. 1 with the housing cover exploded therefrom.

As shown in FIG. 2, the anchor 63a (and, although not described or shown herein in any detail, each of the other anchors 63b, 63c, and 63d) defines a generally cylindrically-shaped aperture adapted to receive an anchor insert 67 and defined by an interior surface 69 which includes a plurality of deformable/crushable ribs 75 which allow the respective anchor inserts 67 to be press-fitted into the anchor 63*a*.

The anchor insert 67 includes a hexagon-shaped head 77, a generally cylindrically-shaped collar 79 extending unitarily outwardly from the head 77, and a threaded interior through-hole 81 extending through the head 77 and the collar 79.

Figure 3:
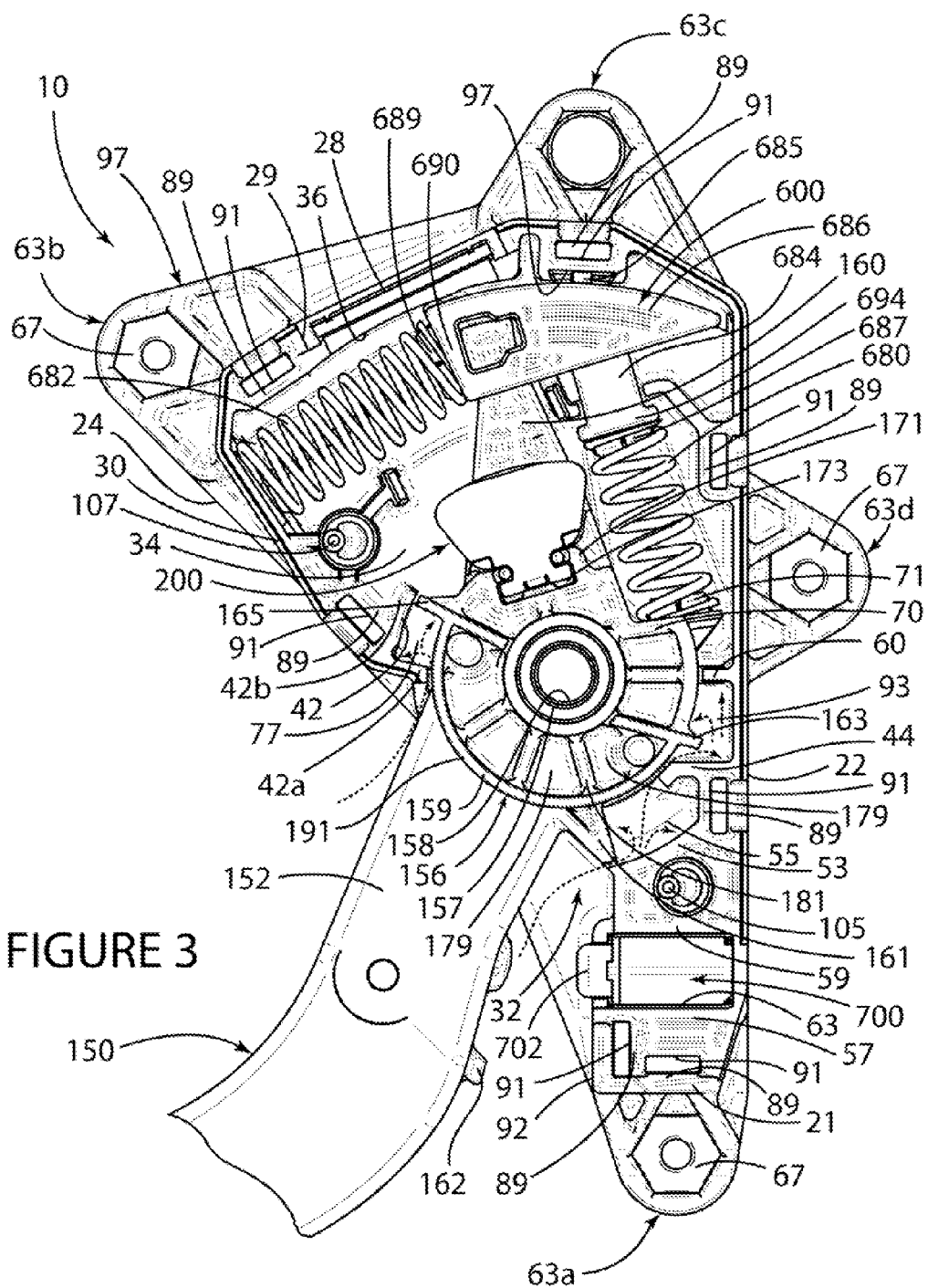
FIG. 3 is a partially broken side elevational view of the vehicle pedal assembly of FIG. 1 without the cover.
Figure 9:
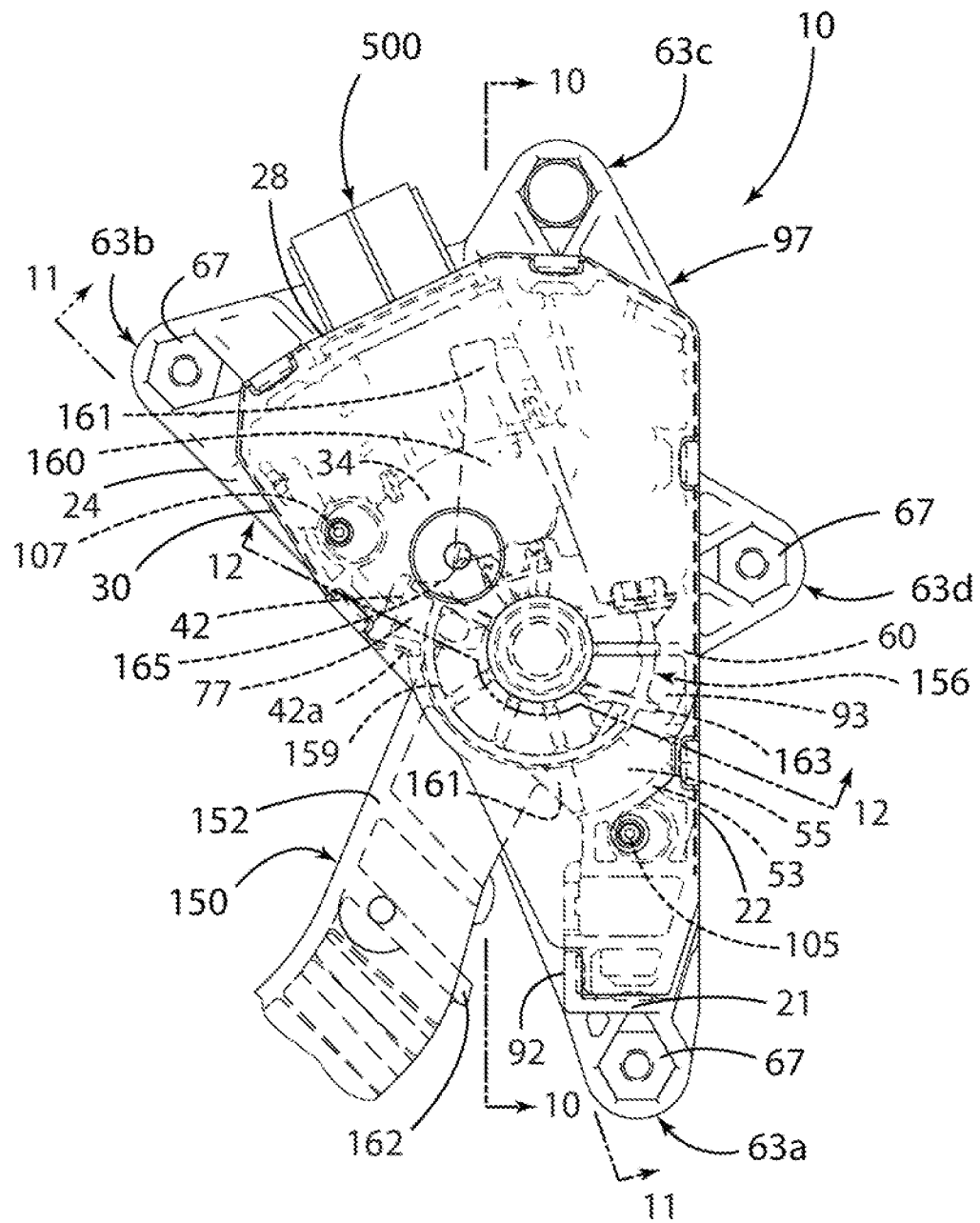
FIG. 9 is a part phantom, side elevational view of the vehicle pedal assembly of FIG. 1.

The pedal housing 20 is securable to a vehicle using fasteners such as bolts or screws (not shown) that pass through the anchor insert 67 in the respective anchors and, more specifically, fasteners that are threaded into and through the through-hole 81 in the insert 67 in the respective anchors and then into respective threaded through-holes (not shown) defined in the firewall (not shown) or the pedal rack (not shown) of the vehicle (not shown). Thus, when the pedal assembly 10 is secured to the vehicle, it is positioned in the vehicle in the generally vertical orientation as shown in FIG. 3 with the pedal 150 and the anchor 63*a* opposite and generally normal to the floor pa (not shown) of the vehicle.

In the embodiment shown, the base housing wall 22, the partial front housing wall 21, the top or rear or back housing wall 28, and the front housing wall 30 are unitary with respective ones of the peripheral edges of the side housing wall 24 to define a housing member 97 and the housing side wall 27 is in the form of and defines a separate housing cover which is coupled and secured to the housing member 97 in a spaced-apart relationship.

Thus, in the embodiment as shown in FIGS. 1*a* and 2, the housing side wall or cover 27 includes a plurality of elongate and flexible clip arms or prongs 83 extending around the periphery of the housing side wall or housing cover 27 in a spaced-apart relationship and, more specifically, in a relationship projecting generally normally outwardly from the peripheral edge of the housing side wall or housing cover 27. Each of the clip arms or prongs 83 includes a distal head 85 having a sloped exterior camming surface and defining a clip shoulder 87.

Moreover, in the embodiment as shown in FIGS. 2, 3, 7, and 8, the housing 20 and, more specifically, the housing base wall 22, the housing side wall 24, the top or rear housing wall 28, and the front housing wall 30 of the housing member 97 thereof, include additional partial walls or ribs 89 of plastic material that define respective clip receiving apertures or brackets 91 that extend around the periphery of the housing member 97 in a spaced-apart relationship.

As shown in FIG. 1*a*, the interior surface of the housing base wall 22, the housing side wall 24, the housing top wall 28, and the housing front wall 30 in the region of the clip receiving apertures or brackets 91 includes a sloped exterior camming segment or portion 93 that defines a clip shoulder 95.

Further, and as shown in FIGS. 1*a* and 2, the housing 20 and, more specifically, the housing base wall 22, the housing top wall 28, and the housing front wall 30 of the housing member 97 thereof, include respective guide posts 98 that project outwardly from the proximal edge thereof in a relationship co-linearly aligned with the respective clip receiving brackets 91 and are adapted to guide and direct the respective dip arms 83 on the housing cover 27 into the respective apertures or brackets 91 in the housing member 97.

Still further, the housing member 97 includes at least first and second guide pins 105 and 107 (FIGS. 2, 3, and 9) protruding generally normally outwardly from the interior surface of the housing side wall 24 and the housing side wall or cover 27 includes a pair of guide pin receiving apertures 109 and 111 (FIGS. 1 and 2) positioned in a diametrically opposed relationship to the respective guide pins 105 and 107. The guide pins 105 and 107 are located in the interior housing cavity 34 with the guide pin 105 located below the drum 156 of the pedal 150 in a relationship opposed, spaced from, and generally parallel to the housing base wall 22 and the guide pin 107 located above the drum 156 in a relationship opposed, spaced from, and generally parallel to the housing front wall 30.

Thus, and referring to FIGS. 1*a* and 2, the securement of the housing cover 27 to the housing member 97 includes initially positioning of the housing cover 27 and the housing member 97 in a generally parallel relationship opposite each other wherein the respective clip arms 83 on the housing cover 27 are co-linearly aligned with the respective guide posts 98 and the respective clip receiving brackets 91 on the housing member 97.

The housing cover 27 and the housing member 97 are then brought together in a relationship wherein the respective guide pins 105 and 107 in the housing member 97 are inserted into the respective guide pin receiving apertures 109 and 111 in the housing cover 27 and the respective clip arms 83 on the housing cover 27 are inserted into the respective clip receiving brackets 91 in the housing member 97 and extended therethrough into the clipped position as shown in FIG. 1*a* wherein the shoulder 87 on the head 85 of the respective clip arms 83 is abutted and wedged against the shoulder 87 defined on the surface of the respective clip receiving brackets 91 for securing the housing cover 27 to the housing member 97.

The pedal 150 includes an elongated pedal arm 152 (FIGS. 1, 2, 3, 4, 7, 8, 9, 10 and 11) with a pedal pad 153 (FIGS. 1 and 2) at a distal first end thereof and a generally cylindrical drum 156 (FIGS. 2, 3, 4, 7, 8, 9, 10, 11, 12, and 13) at a proximal second end thereof.

The drum 156 of the pedal 150 projects from a distal end of the pedal arm 152 and includes a generally cylindrically-shaped body that includes a plurality of interior body chambers 179 separated by a plurality of interior ribs or spokes 181 (FIGS. 2, 3, 4, 10, and 11).

The drum 156, which includes an exterior arcuate surface 191 (FIGS. 2, 3, 4, 7, 8, and 12), also defines a generally cylindrically-shaped through-hole or aperture 158 (FIGS. 3, 7, and 8) that extends generally centrally through the body of the drum 156. A generally cylindrically-shaped collar 157 (only one of which is shown in FIGS. 2, 3, and 4) projects outwardly from each side of the drum 156. An elongated hysteresis pedal lever arm 160 (FIGS. 3, 4, 7, 8, 9, and 10) projects unitarily outwardly from a top or back exterior face of the drum 156.

The distal end and drum 156 of the pedal arm 152 of the pedal 150 extends through the front opening 32 of the pedal housing 20 and into the interior housing cavity 34 and the respective drum collars 157 are seated on respective shoulders (not shown) projecting outwardly from the interior surface of the respective housing side walls 24 and 27 for mounting the drum 156, and thus the pedal 150, to the pedal housing 20 for rotation relative to the pedal housing 20.

The drum 156 also includes a pair of generally arcuate and diametrically opposed peripheral and extended lips or wings or shoulders 157 and 159 (FIGS. 2, 3, 4, 9, 10, and 12) projecting outwardly from respective opposed peripheral side edges of the exterior arcuate surface 191 of the drum 156 in the region of the lower or front portion of the drum 156 located opposite the housing front opening 32.

As shown in FIG. 10, the drum 156 of the pedal 150 extends and is located in the housing 20 in a relationship wherein the extended shoulders 157 and 159 on the drum 156 are positioned opposite, behind, and adjacent the respective extended shoulders 101 and 103 on the respective housing side walls 23 and 27 and further in a relationship wherein the peripheral distal face of the respective extended drum shoulders 157 and 159 are positioned opposite and adjacent the interior surface of the respective housing side walls 24 and 27.

The drum 156 also includes an elongate and generally rectangularly-shaped tongue or projection or tab 161 (FIGS. 2, 3, 4, 7, 8, 9, and 12) which extends and projects outwardly from the exterior surface 191 of the drum 156 in a lower front region of the drum 156 wherein the lower surface of the pedal arm 152 joins the exterior surface 191 of the drum 156. The tab 161 is adapted for movement in the interior of the receptacle 55 defined in the interior of the housing 20 in response to the rotation of the pedal 150.

The drum 156 further includes a pair of additional generally rectangularly-shaped ears or projections 163 and 165 (FIGS. 2, 3, 4, 7, 8, 9, and 12) which extend and project outwardly from the exterior surface 191 of the drum 156. Each of the tabs 163 and 165 extends the full width of the exterior surface 19 the drum 156. The tab 163 includes opposed peripheral shoulders 163a and 163b (FIG. 4) extending outwardly from the opposed sides of the drum 156. In a like manner, the tab 165 includes opposed peripheral shoulders 165a and 165b (FIGS. 4 and 10) extending outwardly from the opposed sides of the drum 156.

The ear 163 projects from a lower or front portion of the drum 156 in a relationship adjoining and unitary with a lower edge of the drum shoulders 157 and 159 and is adapted for movement in the interior of the receptacle 93 defined in the housing 20 in response to the rotation of the pedal 150.

The ear 165 is located on an upper or back portion of the drum 156, and on a side of the drum 156 opposite the side of the drum 156 with the ear 163, in a relationship adjoining and unitary with an upper edge of the drum shoulders 157 and 159 and further in a relationship wherein a distal tip of the ear 165 is positioned opposite and adjacent the interior surface of the free end 42b of the partial interior housing wall or rib 42 to define a chamber 77 (FIGS. 3, 7, 8, and 9). The ear 165 is also adapted for movement relative to the partial wall or rib 42 in response to the rotation of the pedal 150.

In accordance with the present invention and as described in more detail below, the lower tab 161 on the drum 156 and the upper housing wall shoulder 42a define respective first barriers that block the entry of debris through the respective lower and upper portions of the front housing opening 32; the respective extended drum shoulders 157 and 159 in combination with the respective housing wall shoulders 101 and 103 define respective first barriers that block the entry of debris through the respective side portions of the front housing opening 32; the ears 163 and 165 on the drum 156 and the interior lower housing ribs 44 and 60 define secondary barriers in the interior of the housing 20 that block the entry of debris into the upper portion of the interior cavity 34 that houses the hysteresis assembly 600; and the interior housing chambers 77 and 93 and the interior drum chambers 179 define debris retention or settling regions or chambers as also described in more detail below.

Particularly, and because air blown from the vehicle floor pan (not shown) is strongest on the underside of the pedal arm 152 in the orientation of the pedal assembly 10 in a vehicle as shown in FIG. 2, the tab 161 on the drum 156 acts as an initial or first barrier or shield or stop that blocks debris from entering upwardly from the vehicle floor pan into the interior of the pedal assembly 10 via and through the lower portion of the housing opening 32 located below the pedal 150 and the drum 156.

The positioning of the housing rib 42 in a relationship wherein a peripheral portion thereof is positioned opposite and adjacent the exterior surface 191 of the drum 156 creates another initial or first barrier or shield or stop that blocks debris from entering upwardly from the vehicle floor pan into the interior of the pedal assembly 10 via and through the top front portion of the housing opening 32 located above the pedal 150 and the drum 156.

Further, the extended shoulders 101 and 103 on the respective housing side walls 24 and 27 and the extended shoulders 157 and 159 on the exterior surface 191 of the drum 156 together reduce the size of the gap in the region of the opposed sides of the housing front opening 32 and together define an additional first or initial barrier or shield or stop that blocks the entry of debris upwardly from the floor pan into the interior cavity 24 of the housing 20 of the pedal assembly 10 via and through the opposed sides of the housing front opening 32.

A secondary debris barrier or shield or stop is defined by the partial housing wall or rib 44 located behind and above the drum tab 161 and, as described above, is positioned in a relationship adjacent the exterior surface 191 of the drum 156 and blocks any debris which enters through the housing opening 32 from moving or traveling further upwardly into the interior cavity 34 of the housing 20.

The drum ears 163 and 165 act as additional secondary debris barriers or shields or stops that block any debris which passes through the debris barriers described above from moving further upwardly into the portion of the interior cavity 34 of the housing 20 containing the idle stop 46 and the hysteresis assembly 600 as described in more detail below.

More specifically, the distal tip of the ear 165 on the drum 156 is positioned in a relationship opposite and adjacent the interior surface of the free end 42b of the partial housing wall 42; the distal end face of the respective shoulders 165a and 165b of the ear 165 are positioned in a relationship opposite and adjacent the interior surface of the respective housing side walls 24 and 27; the distal tip of the partial housing wall 60 is positioned in a relationship opposite and adjacent the exterior surface 191 of the drum 156; the ear 163 is adapted to abut against the side surface of the partial housing wall 44 in response to rotation of the pedal 150; and the distal end faces of the respective shoulders 163a and 163b of the ear 163 are positioned in a relationship opposite and adjacent the interior surface of the respective housing side walls 24 and 27 to define additional second or secondary debris barriers or shields or stops that block debris from moving further upwardly into the portion of the interior cavity 24 of the housing 20 containing the idle stop 46 and the hysteresis assembly 600.

Still further, the region or space between each of the exterior side faces of the drum 156 and the interior surface of the respective housing side walls 24 and 27 in the horizontal direction and between the drum shoulders 157 and 159 and the drum ear shoulders 163b and 165b in the vertical direction define respective interior housing chambers 167a and 167b (FIG. 12) on opposed sides of the drum 156 in which the air velocity will be very low (by virtue of the fact that the majority of the air has been blocked by the initial debris barriers described above and more specifically by the extended drum shoulders 157 and 159) and thus define regions in which gravity can force debris to settle and collect in the respective chambers 77, 93, and/or 179.

Still further, and as a result of the incorporation of successive barriers or shields in the pedal assembly 10 as described above, the upper portion or region of the housing cavity 34 containing the idle stop 46 and the hysteresis assembly 600 is a portion or region or chamber of the housing 20 containing only low velocity air and any debris in this portion or region or chamber would be required to work against the forces of gravity to reach any portion of the idle stop 46 or the hysteresis assembly 600 which are both positioned and located adjacent the top or back housing wall 28 of the housing 20.

Referring back to FIGS. 2, 3, and 4, the drum 156 of the pedal 150 further includes a magnet assembly bracket 171 (FIGS. 3 and 4) that projects outwardly from a back or top face of the drum 156 and is defined by a pair of generally L-shaped spaced-apart hooks or fingers 171a and 171b (FIG. 4) that protrude outwardly from a back or top portion of the exterior surface of the drum 156 in a diametrically opposed relationship and together define an interior recess or pocket 173 (FIGS. 3 and 4) in the drum 156. The interior face of each of the fingers 171a and 171b includes a crushable rib (not shown) projecting outwardly therefrom in the direction of the exterior surface of the drum 156.

As shown in FIGS. 3, 4, 7, 8, and 9, the pedal 150 also includes a pedal lever arm 160 which projects from a back or top portion of the exterior surface of the drum 156 and extends upwardly and rearwardly through the interior housing cavity 34 in a relationship between and spaced from the two spaced-apart housing side walls 24 and 27 and terminating in a distal tip 164 (FIGS. 7, 8, and 9) that is positioned in a relationship below and spaced from the interior surface 36 of the top or back housing wall 28.

In the idle/disengaged position of the pedal 150 as shown in FIG. 7, a first exterior side face of the distal tip 164 of the pedal lever arm 160 is positioned in abutting relationship with the side surface or face of the idle stop 46 and, more specifically, in an abutting relationship with the side surface or face of the shouldered end 49 of the partial wall 46 in the housing 20.

Referring to FIGS. 3, 4, 7 and 8, the back or top of the pedal drum 56 further includes a recess or shoulder 70 that defines a base for the coil spring 680 of the hysteresis assembly 600 as described in more detail below. The shoulder 70 is located on a lower or back or top side of the drum 56 located opposite the housing base wall 22.

The pedal assembly 10 additionally comprises a sensor assembly defined by the combination of a magnet assembly 200 (FIGS. 2, 3, 4, 5, and 10) and a magnetic field sensor 300 (FIG. 10), both located in the portion of housing cavity 34 between the back or rear of the drum 156 and the top or rear wall 28 of the housing 20.

Further details of the use and construction of the magnet assembly 200 can be found in U.S. Pat. No. 6,211,668 entitled "Magnetic Position Sensor Having Opposed Tapered Magnets", the contents of which are herein incorporated by reference in their entirety.

In the embodiment of the magnet assembly 200 as shown in FIGS. 2, 3, 4, 5, and 10, the magnet assembly 200 comprises a pair of spaced-apart and generally parallel magnet plates 202 and 204 (FIGS. 4 and 5) which are each formed of bonded ferrite or other suitable magnetic material, and are coupled together to a base 206 (FIGS. 4 and 5).

As described in more detail in U.S. Pat. No. 6,211,668 and incorporated herein by reference, each of the magnet plates 202 and 204 is, in the embodiment shown, tapered in a manner wherein the thickness of the respective plates 202 and 204 at each of the respective end portions thereof is greater than the thickness of the respective plates 202 and 204 at each of the respective center/middle portions thereof and further in a manner wherein the thickness of the respective plates 202 and 204 increases gradually between the respective center/middle portions thereof and the respective end portions thereof. An elongate interior gap or space 205 (FIGS. 4 and 5) is defined between the two magnet plates 202 and 204.

The base 206 of the magnet assembly 200 includes a pair of co-linearly aligned and elongate recesses or grooves 210 and 212 (FIGS. 4 and 5) defined in the opposed transverse sides of the base 206 and a second pair of recesses or grooves 214 and 216 (FIG. 5) defined in the opposed longitudinal sides of the base 206.

The magnet assembly 200 also comprises a pair of metal magnet pole plates 218 and 220 (FIGS. 3, 4, and 5), each of which is generally fan-shaped and matches the shape of the magnet plates 202 and 204, and includes an inwardly bent base tab 217 (FIGS. 4 and 5). The magnet pole plate 218 is seated over the exterior surface of the magnet plate 202 with the tab 217 thereof seated in the groove 214 defined in the base 206 of the magnet assembly 200. In a like manner, the magnet pole plate 220 is seated over the exterior surface of the magnet plate 204 with the tab 217 thereof seated in the groove 216 defined in the base 206 of the magnet assembly 200.

The magnet assembly 200 in turn is slid onto and coupled to the bracket 171 on the back or top of the drum 156 in a relationship wherein the respective fingers 171b and 171a of the bracket 171 extend into the respective grooves 210 and 212 defined in the base 206 of the magnet assembly 200. The ribs (not shown) on the fingers 171a and 171b are deformed/crushed upon clipping of the magnet assembly 200 to the drum bracket 171 to provide a press-fit of the magnet assembly 200 to the pedal drum 156.

The magnetic field sensor 300 (FIG. 10) is positioned in the space or gap 205 of the magnet assembly 200 in a relationship spaced, opposed, and generally parallel to the magnet plates 202 and 204.

As described in more detail in U.S. Pat. No. 6,211,668 and incorporated herein by reference, the magnet assembly 200 is adapted to create a variable magnetic field that is detected by the magnetic field sensor 300 which, in the embodiment shown, is a Hall effect sensor. The magnet assembly 200 and the sensor 300 provide an electrical signal that is representative of the rotational position or displacement of the pedal 150 relative to the housing 20. In one embodiment, the magnetic field sensor 300 may be a single Hall effect component or device. In the embodiment shown, the magnetic field sensor 300 is an integrated circuit commercially available from Melexis Corporation of Ieper, Belgium.

Hall effect sensor 300 is responsive to flux changes induced by the pedal displacement as shown in FIGS. 7 and 8 and the corresponding displacement of the magnet assembly 200. Electrical signals from the sensor 300 have the effect of converting the displacement of the pedal 150, as indicated by the displacement of the magnet assembly 200, into a dictated speed/acceleration command which is communicated to an electronic control module such as is shown and described in U.S. Pat. No. 5,524,589 to Kikkawa et al. and U.S. Pat. No. 6,073,610 to Matsumoto et al., the disclosures of which are hereby expressly incorporated herein by reference.

In the embodiment as shown in FIG. 10, the Hall effect sensor 300 is mounted, as by soldering or the like, to one of the side surfaces of a generally planar printed circuit board 400 (FIGS. 2 and 10).

Other electronic components (not shown) including, for example, amplifiers and filters, can also be mounted to one or both of the side surfaces of the printed circuit board 400 to allow the processing of the signals generated by the Hall effect sensor 300.

The printed circuit board 400 in turn is mounted to a combination printed circuit board holder/connector assembly 500 (FIGS. 2 and 10) which includes a generally rectangularly-shaped holder/frame 502 (FIGS. 2 and 10) for the printed circuit board 400 and a connector housing 504 (FIGS. 2 and 10) unitary with the printed circuit board holder/frame member 502.

The connector assembly 500 is coupled to the housing 20 in a relationship wherein the frame 502 thereof is located in the housing cavity 34 and at least a portion of the frame 502 containing the sensor 300 extends into the space or gap 205 defined between the magnet plates 202 and 204 of the magnet assembly 200; and the connector housing 504 extends through the opening 29 defined in the top or back housing wall 28.

Terminals (not shown) extend from the printed circuit board 400 into the interior of the connector housing 504 which, in turn, are adapted to be mated to an electrical wiring harness (not shown) that includes a connector adapted to be fitted within the interior of the connector housing 504 and which, in turn, is adapted to be connected to an engine controller or computer in the vehicle.

The pedal assembly 10 still further comprises a hysteresis assembly 600 (FIGS. 3, 7, and 8) which is comprised of the following separate elements which are all separate and decoupled from each other and the pedal 150: first and second springs 680 and 682 (FIGS. 3, 7, and 8), a friction pressure plunger 684 (FIGS. 3, 6, 7, and 8), a friction pressure plate 685 (FIGS. 3, 7, and 8), and a friction-generating device or sled 686 (FIGS. 3, 6, 7, and 8), all located in the interior housing cavity 34 between the drum 156 and the back or top housing wall 28.

In the embodiment shown, the friction sled 686 and the second spring 682 of the hysteresis assembly 600 are positioned in an angled relationship (approximately between 90 to 100 degrees) relative to the friction plunger 684 and the first spring 680 of the hysteresis assembly 600 with the friction sled 685 and the second spring 682 of the hysteresis assembly 600 both located in the interior cavity 34 of the housing 20 between the drum 156/magnet assembly 200 and the back or rear or top wall 28 of the housing 20 and with the friction pressure plunger 684 and the first spring 680 both located in the interior cavity 34 of the housing 20 between the drum 156/magnet assembly 200 and the base wall 22 of the housing 20.

The friction pressure plate 685 is seated in a recess or groove 97 (FIGS. 3, 7, and 8) defined in the interior surface 36 of the top or back housing wall 28 in a region of the top or back housing wall 28 located opposite the partial walls 46 and 47 defined in the interior of the housing 20.

The friction sled 686, which is decoupled and separate from the pedal 150, includes a generally elongate and arcuate base 688 (FIGS. 3, 6, 7, and 8) that includes an interior surface abutted against the friction pressure plate 685 and an exterior surface abutted against the interior surface 36 of the top or back housing wall 28 and is located in the interior housing cavity 34 of the housing 20 in the space thereof located and defined between the partial walls 46 and 47 and the top or back housing wall 28.

The friction sled 686 is positioned in the housing cavity 34 in a relationship opposite and adjacent the interior surface 36 of the back or top housing wall 28 and further in a relationship generally normal to the housing base wall 22.

The friction sled 686 also includes a lip 690 (FIGS. 3, 6, 7, and 8) that extends generally normally outwardly from the end of the base 688 and includes an exterior spring base or collar 689 (FIGS. 3, 6, 7, and 8) formed on an exterior surface thereof.

As shown in FIG. 7, in the idle/disengaged position of the pedal 150, the distal tip 164 of the drum lever arm 160 extends and is located inside the friction sled 686 in a relationship sandwiched between the interior surface of the lip 690 of the friction sled 686 and the exterior surface of the second end 49 of the idle stop wall 46 and, more specifically, is positioned therebetween in a relationship wherein a first side face of the distal tip 164 is in abutting relationship with the interior surface of the friction sled lip 690 and the second opposed side face of the distal tip 164 is in abutting relationship with the exterior side surface of the end 49 of the idle stop wall 46.

As still further shown in FIGS. 6, 7, and 8, the friction pressure plunger 684 is generally I-shaped in vertical cross-section and is comprised of a generally elongate central base plate 692 and two end plunger plates 694 and 696. The plunger plate 694 projects generally normally and unitarily outwardly from one end of the base 692 while the plunger plate 696 projects generally angularly and unitarily outwardly from the opposite end of the base 692.

The friction pressure plunger 684 is located and positioned in the interior housing cavity 34 of the pedal housing 20 in an angled relationship (approximately between 90 to 100 degrees) relative to the friction sled 686 in which the elongate central base 692 thereof is seated in and extends through the channel 51 defined by and between the partial interior housing walls or ribs 46 and 47; the plate 694 is located below and generally parallel to the lower ends or shoulders 48 of the partial interior housing walls or ribs 46 and 47 and the plate 696 is located between the upper ends of the partial interior housing walls or ribs 46 and 47 and the base 688 of the friction sled 686 in a relationship wherein the outer surface of the plunger plate 696 is abutted against the outer surface of the base 688 of the friction sled 686.

The first spring 680 which, in the embodiment shown is of the helical coil type, extends between the drum shoulder 70 and the friction pressure plunger 684 in a generally co-linear relationship relative to the friction pressure plunger 684 and in an angled relationship (approximately between 90 to 100 degrees) relative to the friction sled 686 and, more specifically and as shown in FIGS. 3, 7, and 8, includes a first lower end abutted against, and surrounding the spring collar 71 (FIGS. 3, 7, and 8) on, the drum shoulder 70 and an opposed second upper end abutted against, and surrounding the spring collar 687 (FIGS. 3, 7, and 8) on, the outer surface of the lower plunger plate 694 of the friction pressure plunger 684.

The second spring 682 is also of the helical coil type and is positioned in the interior housing cavity 34 in an angled (approximately between 90 to 100 degrees) relationship relative to the friction pressure plunger 684 and the first spring 680, in a relationship generally co-linear with and in the same direction as the friction sled 686, and in a relationship generally parallel to and adjacent the interior surface 36 of the back or top housing wall 28. The second spring 682 extends between the spring base defined by the interior surface of the front housing wall 30 and the friction sled 686 and, more specifically and as also shown in FIGS. 3, 7, and 8, includes a first end abutted against the interior surface of the housing wall 30 and an opposed second end abutted against, and surrounding the spring collar 689 (FIGS. 3, 7, and 8), on the exterior surface of the lip 690 of the friction sled 686.

In the embodiment as shown in FIGS. 7 and 8, the pedal 150 is rotatable relative to the pedal housing 20 in a counter-clockwise direction in response to the application of a step force against the pedal pad 153 (FIGS. 1 and 2) by the foot (not shown) of the vehicle operator (not shown).

The counter-clockwise rotation of the pedal 150 from its idle or rest or disengaged position as shown in FIGS. 3 and 7 where the distal tip 164 of the pedal lever arm 160 is abutted against the idle stop 46 into the engaged or acceleration position shown in FIG. 8 where the acceleration pedal stop 162 on the underside of the pedal arm 152 is abutted against the pedal stop surface 92 on the front wall 30 of the housing 20 causes the counter-clockwise rotation of the drum 156 which causes the compression of the first spring 680 which causes the distal end of the first spring 680 to move and exert a compressive spring force against the plate 694 of the friction pressure plunger 684 which, in turn, is transmitted through the base 692 of the plunger 684 to the upper plate 696 of the plunger 684 to exert a compressive force against the base 688 of the friction sled 686 which, in turn, causes or presses or pushes the base 688 of the friction sled 686 upwardly or rearwardly in the housing cavity 34 into abutting frictional contact with the friction pressure plate 685 located in the interior surface 36 of the back housing wall 28 which, in turn, causes the generation and transfer of a first frictional resistance pedal arm hysteresis force to the pedal 150 of the type disclosed in, for example, U.S. Pat. No. 7,404,342, the description of which is incorporated herein by reference for the purpose of emulating the feel and tactile response of a cable-driven pedal assembly in a cable-less, non-contacting sensor-based pedal assembly of the present invention.

As further shown in FIG. 8, the counter-clockwise rotation of the pedal 150 also simultaneously causes the counter-clockwise movement and rotation of the pedal lever arm 160 in the interior housing cavity 34 in the direction of and towards the housing front wall 30 (away from the idle stop 46) which, as a result of the placement of the distal tip 164 of the pedal lever arm 160 in the interior of the friction sled 686 and in an abutting relationship with the lip 690 of the friction sled 686, causes the counter-clockwise movement of the friction sled 686 along and against the interior surface 36 of the back or top housing wall 28 away from the housing base wall 22 and towards the housing front wall 30 which, in turn, causes the compression of the second spring 682 seated against the exterior surface of the lip 690 of the friction sled 686.

In accordance with the invention, the level or magnitude of the frictional resistance hysteresis force generated and transferred to the pedal 150 by the hysteresis assembly 600 will be dependent upon and may be adjusted or changed by adjusting or changing a variety of parameters including, but not limited to, the following: the material and/or spring force characteristics of the coil springs 680 and 682; the material or profile or configuration or location of the friction plunger 684 and the friction sled 686; the material profile or configuration of the friction plate 685; and the profile or configuration or location of the pedal lever arm 160 and drum shoulder 70.

Further, and as shown in FIGS. 1, 2, 3, 7, and 8, the pedal assembly 10 also comprises a pedal kickdown assembly 700 of the type disclosed in U.S. Patent Application Publication No. US 2009/0173587 published on Jul. 9, 2009, the disclosure of which is also incorporated herein by reference.

The pedal kickdown assembly 700, which includes a plunger 702 (FIGS. 1, 2, 3, 7, and 8), is mounted in the housing 20 and, more specifically, is mounted in the receptacle 63 defined in the housing 20 in a relationship generally normal to the housing base wall 22 herein the plunger 702 protrudes outwardly from the base 22 of the housing 20 and is positioned opposite and spaced from the lower interior surface of the pedal arm 152 in the idle position of the pedal 150 as shown in FIGS. 1, 2, 3, and 7.

The pedal kickdown assembly 700, which is located outside of the housing cavity 34 and below the drum 156 and which extends and is positioned in an orientation and direction generally opposite and under the pedal arm 152, is activated when the pedal 150 is rotated counter-clockwise from its position in FIGS. 1, 2, 3, and 7 into its position as shown in FIG. 8 wherein the underside or interior surface of the pedal arm 152 is brought into abutting relationship with the top of the plunger 702 which, initially, generates an opposing mechanical resistance force on the pedal and provides a tactile feedback to the foot of the operator followed by depression of the plunger 702 in response to the further depression and rotation of the pedal 150.

Although not described in any detail herein, it is understood that removal by the operator of his/her foot from the pedal 150 causes the first spring 680 to expand which causes the proximal end of the first spring 680 to move and exert a compressive force against the drum shoulder 70 which causes the clockwise rotation of the drum 156 and drum shoulder 70 which, in turn, reduces the pressure or force applied by the first spring 680 on the plunger 684 which, in turn, reduces the frictional contact between the friction sled 686 and the friction plate 685 and rotates and returns the pedal 150 to its idle position of FIG. 7 in which the pedal lever arm 160 is abutted against the idle stop 46. Removal of an operator's foot from the pedal 150 also moves the pedal away from the plunger 702 of the pedal kickdown assembly 700 to deactivate the kickdown assembly 700.

It is further understood that removal by the operator of his/her foot from the pedal 150 also relieves the pressure or force applied to the second spring 682 by the pedal lever arm 160 which, in turn, allows the expansion of the second spring 682 which, in turn, allows the distal end of the second spring 682 to move and exert a compressive spring force against the lip 690 of the friction sled 686 which simultaneously pushes the friction sled 686 along and against the friction plate 685 in a second clockwise direction back towards the housing base wall 22 that is opposite the first counter-clockwise direction away from the housing base wall 22 which the lever arm 160 moves the friction sled 686 when the pedal 150 is rotated counter-clockwise and additionally also pushes the pedal arm lever 160 and the pedal 150 back clockwise in the direction of the housing base wall 22 back into its idle/disengaged/rest position and configuration as shown in FIG. 7.

It is still further understood that the vehicle pedal assembly 10 and the hysteresis assembly 600, and more specifically the first and second springs 680 and 682, the friction pressure plunger 684, the friction pressure plate 685, the friction sled 686, and the pedal lever arm 160 define means structured and operated in a manner that allow the pedal 150 to rotate from its acceleration/depressed position or condition of FIG. 8 and return back into its idle/disengaged position of FIG. 7 immediately upon removal of the operator's foot and corresponding foot force from the pedal 150 independent of the operability and with and without the movement of the first or second springs 680 and 682, the friction plunger 684, or the friction plate 685 as described above and in more detail below.

Specifically, if the second spring 682 becomes inoperable for any reason while the pedal 150 is in the acceleration/depressed position or condition of FIG. 8, as for example where the second spring 682 is unable to expand and thus unable to move and exert the compressive spring force against the lip 690 of the friction sled 686 and thus unable to move the friction sled 686 and thus the pedal level arm 160 clockwise to return the pedal 150 to its idle position, the removal of the operator's foot and corresponding foot force from the pedal 150 will cause an expansion of the first spring 680 which, in turn, will cause the proximal end of the first spring 680 to exert a compressive force against the shoulder 70 of the drum 156 of the pedal 150 which, in turn, will cause the clockwise rotation of the drum 156 and thus the clockwise rotation and return of the pedal 150 back into its idle/disengaged position of FIG. 7.

Thus, the use of hysteresis assembly elements which are separate and decoupled from each other and the pedal 150 as described above and further the use of a hysteresis assembly 600 that includes a first spring 680 that is separate and operates independently of the second spring 682 provides and allows for the rotation and return of the pedal 150 to its idle position without the compressive spring force of the second spring 682 against the friction sled 686.

Additionally, if the friction sled 686 becomes inoperable or unable to move for any reason while the pedal 150 is in the acceleration/depressed position or condition of FIG. 8, the removal of the operator's foot and corresponding foot force from the pedal 150 will cause an expansion of the first spring 680 which, in turn, will cause the proximal end of the first spring 680 to exert a compressive spring force against the shoulder 70 of the drum 156 which, in turn, will cause the clockwise rotation of the drum 156 and thus the clockwise rotation and return of the pedal 150 back into its idle/disengaged position of FIG. 7.

Thus, the use of hysteresis assembly elements which are separate and decoupled from each other and the pedal 150 as discussed above and further the use of a hysteresis assembly 600 including a friction sled 686 and a first spring 680 that are decoupled and separate from each other and the pedal 150 allows the first spring 680 to rotate and return the pedal 150 back into its idle/disengaged position of FIG. 7 both with and without the operability or movement of the friction sled 686 as described above.

Further, if the first spring 680 becomes inoperable for any reason while the pedal 150 is in the acceleration/depressed position or condition of FIG. 8, as for example where the first spring 680 is unable to expand and thus unable to move and exert the compressive spring force against the shoulder 70 of the drum 156 of the pedal 150 to cause the clockwise rotation of the pedal 150 back into its idle position as described above, the pressure or compressive spring force applied by the distal end of the spring 680 on the friction pressure plunger 684 will be reduced which, in turn, will reduce the frictional contact between the friction sled 686 and the friction plate 685 which, upon removal of the operator's foot and corresponding foot force from the pedal 150 will cause the expansion of the second spring 682 which will cause the distal end of the second spring 682 to move and exert a compressive spring force against the lip 690 of the friction sled 686 which will cause the clockwise movement of the friction sled 686 which, in turn, will cause the clockwise movement of the pedal lever drum 160 that is abutted against the interior surface of the lip 690 of the friction sled 686 which, in turn, will cause the clockwise rotation of the drum 156 and thus the clockwise rotation and return of the pedal 150 back into its idle/disengaged position of FIG. 7.

Thus, the use of hysteresis assembly elements as described above which are separate and decoupled from each other and the pedal 150 as described above and further the use of a vehicle pedal assembly 10 and hysteresis assembly 600 that includes a pedal lever arm 160, a friction sled 686, and a second spring 682 that is separate from and operates independently of the first spring 680 provides and allows for the rotation and return of the pedal 150 to its idle position without the compressive spring force of the first spring 680 against the pedal 150.

Still further, if the friction pressure plunger 684 becomes inoperable or unable to move for any reason while the pedal 150 is in the acceleration/depressed position or condition of FIG. 8, the removal of the operator's foot and corresponding foot force from the pedal 150 will cause an expansion of the first spring 680 which, in turn, will cause the proximal end of the first spring 680 to exert a compressive force against the shoulder 70 of the drum 156 which, in turn, will cause the clockwise rotation of the drum 156 and thus the clockwise rotation and return of the pedal 150 back into its idle/disengaged position of FIG. 7.

Thus, the use of hysteresis assembly elements which are separate and decoupled from each other and the pedal 150 as discussed above and further the use of a friction pressure plunger 684 that is separate and decoupled from the pedal 150, the friction sled 686, and the first spring 680 allows the first spring 680 to rotate and return the pedal 150 back into its idle/disengaged position of FIG. 7 both with and without the operability and movement of the friction pressure plunger 684 as described above.

Numerous variations and modifications of the pedal assembly 10 described above may be effected without departing from the spirit and scope of the novel features of the invention. It is thus understood that no limitations with respect to the vehicle pedal assembly and hysteresis assembly illustrated herein are intended or should be inferred. It is, of course, intended to cover by the appended claims all such modifications as fall within the scope of the claims.

We claim:

1. A vehicle pedal assembly comprising:
   a pedal housing;
   a pedal extending into the pedal housing, the pedal being mounted to the pedal housing for rotation relative to the pedal housing; and
   a pedal hysteresis assembly in the pedal housing including:
      a friction device adapted for movement in the pedal housing;
      a friction plunger adapted to exert a force against the friction device;
      a first spring extending between the pedal and the friction plunger and adapted to exert a spring force against the friction plunger which causes the friction plunger to exert the force against the friction device which causes the friction device into abutting frictional contact with the pedal housing in response to the rotation of the pedal to generate and transfer a resistance force to the pedal;
      a lever arm extending from the pedal into contact with the friction device and adapted to move the friction device in a first direction in response to the rotation of the pedal; and
      a second spring in contact with the friction device and adapted to exert a spring force against and move the friction device in a second direction opposite the first direction.

2. The vehicle pedal assembly of claim 1 wherein the pedal housing defines a channel and the friction plunger is adapted to move in the channel.

3. The vehicle pedal assembly of claim 2 wherein the friction plunger includes an elongate base extending in the channel and opposed plunger plat adapted to abut against the first spring and the friction device respectively.

4. The vehicle pedal assembly of claim 1 wherein the friction device includes a base abutted against an interior surface of the pedal housing and a wall, the second spring and the lever arm abutting against the wall of the friction device.

5. The vehicle pedal assembly of claim 4 wherein the wall of the friction device extends between the second spring and the lever arm.

6. The vehicle pedal assembly of claim 1 wherein the first end of the pedal includes a drum defining a shoulder, the first spring extending between the shoulder on the drum and the friction plunger.

7. The vehicle pedal assembly of claim 1 wherein the pedal housing defines a front opening and includes a back wall, the pedal extending through the front opening, and the friction device being adapted for frictional contact with the back wall of the housing.

8. A vehicle pedal assembly comprising:
a pedal housing;
a pedal extending into the pedal housing and adapted for rotation relative to the pedal housing from an idle position in response to the application of a foot force against the pedal; and
a pedal hysteresis assembly in the pedal housing including a friction device and a friction plunger adapted for movement along different lines in the pedal housing in response to the rotation of the pedal from the idle position; and
means in the pedal housing for returning the pedal to its idle position including a lever arm extending from the pedal into contact with the friction device and first and second springs extending along different lines in the pedal housing, the first spring extending between the pedal and the friction plunger and adapted to return the pedal to its idle position with and without movement of the friction device, the second spring extending between a wall of the pedal housing and the friction device and adapted to return the pedal to its idle position with the movement of the friction device.

9. The vehicle pedal assembly of claim 8 wherein the first spring generates a first compressive force that causes the friction device into abutting frictional contact with the pedal housing in response to the rotation of the pedal for generating and transferring a resistance force to the pedal, the first spring also being adapted to exert a second compressive force against the pedal in response to the removal of the foot force from the pedal that returns the pedal to its idle position with and without the movement of the friction device.

10. The vehicle pedal assembly of claim 9 wherein the friction plunger extends between the first spring and the friction device, the first spring being adapted to exert the first spring compression force against the friction plunger which causes the friction device into abutting frictional contact with the pedal housing.

11. The vehicle pedal assembly of claim 10 wherein the second spring is adapted to exert a compressive spring force against the friction device in response to the removal of the foot force from the pedal which causes the movement of the friction device, the rotation of the pedal lever arm, and the return of the pedal to its idle position without the second compressive force of the first spring.

12. A vehicle pedal assembly comprising:
a pedal housing;
a pedal extending into the pedal housing, the pedal being mounted to the pedal housing for rotation relative to the pedal housing from an idle position in response to the application of a foot force against the pedal; and
a pedal hysteresis assembly in the pedal housing including:
a friction device that is separate from the pedal and adapted for movement in the pedal housing;
a friction plunger that is separate from the friction device and the pedal and adapted to exert a force against the friction device;
a first spring that is separate from the pedal and the friction device and the friction plunger and extends between the pedal and the friction plunger and is adapted to exert a first spring force against the friction plunger which causes the friction plunger to exert the force against the friction device which causes the friction device into abutting frictional contact with the pedal housing in response to the rotation of the pedal to generate and transfer a resistance force to the pedal, the first spring also being adapted to exert a second spring force against the pedal in response to the removal of the foot force from the pedal that returns the pedal to its idle position with and without the movement of the friction device;
a lever arm extending from the pedal into contact with the friction device and adapted to move the friction device in a first direction in response to the rotation of the pedal; and
a second spring in contact with the friction device and adapted to exert a spring force against and move the friction device and the lever arm in response to the removal of the foot force from the pedal that returns the pedal to its idle position without the second spring force of the first spring, the first spring further being adapted to exert the second spring force against the pedal in response to the removal of the foot force from the pedal to return the pedal to its idle position without the spring force of the second spring.

* * * * *